US 6,728,216 B1

(12) United States Patent
Sterner

(10) Patent No.: US 6,728,216 B1
(45) Date of Patent: *Apr. 27, 2004

(54) ARRANGEMENT IN A NETWORK REPEATER FOR MONITORING LINK INTEGRITY AND SELECTIVELY DOWN SHIFTING LINK SPEED BASED ON LOCAL CONFIGURATION SIGNALS

(75) Inventor: Rudolph Sterner, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/256,779

(22) Filed: Feb. 24, 1999

Related U.S. Application Data
(60) Provisional application No. 60/076,360, filed on Feb. 27, 1998.

(51) Int. Cl.[7] .................................................. H04J 3/16
(52) U.S. Cl. ........................................ 370/252; 370/465
(58) Field of Search ................................ 370/254, 252, 370/241, 248, 251, 247, 245, 246, 243, 296, 279, 293, 465, 466, 316, 332, 333, 338, 441, 342, 232, 468, 401, 351, 352, 249, 389, 392, 402, 403, 419, 423, 437, 447, 458, 445, 451, 462, 467; 455/67.1, 422, 450, 452, 453, 507, 517, 524, 437, 522; 710/26, 56; 375/224, 236

(56) References Cited

U.S. PATENT DOCUMENTS

| 4,710,925 A | | 12/1987 | Negi |
|---|---|---|---|
| 5,442,625 A | * | 8/1995 | Gitlin et al. ................ 370/468 |
| 5,488,609 A | * | 1/1996 | Hluchyj et al. ............ 370/232 |
| 5,491,687 A | | 2/1996 | Christensen |
| 5,541,957 A | | 7/1996 | Lau |
| 5,621,737 A | * | 4/1997 | Bucher ........................ 714/704 |
| 5,857,147 A | * | 1/1999 | Gardner ...................... 370/236 |
| 5,982,760 A | * | 11/1999 | Chen .......................... 370/335 |
| 6,584,109 B1 | * | 6/2003 | Feuerstraeter et al. ...... 370/401 |

FOREIGN PATENT DOCUMENTS

| EP | 0334510 A | 9/1989 |
|---|---|---|
| WO | WO9729573 A | 8/1997 |

* cited by examiner

Primary Examiner—Dang Ton

(57) ABSTRACT

A network repeater having a plurality of repeater ports selectively establishes links with remote nodes at one of two data rates based on the capabilities of the remote network node, configuration information supplied by user in circuitry, and a determined link integrity. A network repeater establishes a link with a network node using auto-negotiation techniques to establish a 100 Mb/s link. The network repeater than monitors the link for symbol errors, and determines an integrity of the link based on a detected number of symbol errors relative to a prescribed threshold in a dual-counter configuration. If the detected number of symbol errors counted by the first counter within a first number of received symbols, the second counter is incremented and the first counter reset. If over a second, longer interval the second counter reaches a second threshold reaches the prescribed threshold, indicating poor link integrity due to poor cable connection or condition, faulty network device, etc., causing repeated symbol errors over a greater distribution of received symbols the network repeater performs a down shifting operation by breaking the established 100 Mb/s link, and restarting auto-negotiation to establish a 10 Mb/s link. Hence, the network repeater may monitor high-speed links for link integrity, and selectively downshift a link encountering a substantial number of errors to a reduced data rate, without a necessity of monitoring and control by a network manager or other remote management agent. Rather, an interrupt is output from the network repeater to the user circuitry in response to a determined poor link integrity or downshifting operation, enabling the user circuitry to then determine the status of the network repeater.

10 Claims, 2 Drawing Sheets

ARRANGEMENT IN A NETWORK REPEATER FOR MONITORING LINK INTEGRITY AND SELECTIVELY DOWN SHIFTING LINK SPEED BASED ON LOCAL CONFIGURATION SIGNALS

CROSS REFERENCE TO RELATED APPLICATIONS

This application claims priority from copending Provisional Application No. 60/076,360, filed Feb. 27, 1998.

BACKGROUND OF THE INVENTION

1. Field of the Invention

The present invention relates to network repeaters, more specifically to an IEEE 802.3 compliant repeater providing a bridge between two media domains operating at respective data rates.

2. Background Art

Network repeaters are typically used as a bridge between network nodes, for example network stations serving as data terminal equipment (DTE) on different network media. Repeaters provide the advantage of extending the physical distance between network nodes by receiving a data packet from one network medium, reconditioning the physical signal, and outputting the data packet to a second network medium. The repeater may also forward carrier sense and collision signals, effectively extending the collision domain of one medium onto the second medium. Repeaters in connecting network nodes on different network media have conventionally been configured to connect only networks operating at the same transmission rate. One problem encountered in higher-speed networks, for example 100 Mb/s IEEE 802.3 networks, is the identification of a link, between the network repeater and a remote network node on one of the network repeater ports, having a poor level of integrity. In particular, there is a need to discover links between a repeater port and a network node that are not performing up to specifications, for example due to a poor cable connection or condition, a faulty network interface device at the remote node, etc.

One proposal for handling link failure is by using network management capabilities, for example, a remote management agent (i.e., network manager) configured for monitoring and controlling operations of the repeater and the network nodes. For example, the remote management agent uses a management protocol to transmit management information between the repeater and the remote management agent. However, such an arrangement necessarily relies on a management agent, and hence is inapplicable in unmanaged network. Moreover, the monitoring of links by a centralized management agent increases the complexity and processing requirements of the management agent. For example, the management agent may need to determine link integrity by flooding the network with test packets, monitor the responses from the network nodes, and reconfigure each node separately. Such an arrangement is both inefficient and expensive from a resource management standpoint.

In addition, reliance on a centralized management agent creates substantial cost concerns. Hence, network customers are often forced to choose between managed networks having a high cost and lower-cost unmanaged networks incapable of handling link integrity problems that occur at higher data rates.

SUMMARY OF THE INVENTION

There is a need for an arrangement for interconnection of different speed network nodes using a repeater, where the link integrity between a repeater and the network nodes can be reliably monitored without the necessity of a network manager.

There is also a need for an arrangement in a network having a repeater for monitoring the link status of high speed data links, and selectively changing a selected high speed data link to a slower data rate based on detection of a marginal or unacceptable link status on the selected high speed data link and user configuration signals supplied locally to the repeater (i.e., without the necessity of a network manager).

There is also a need for an arrangement in a network repeater for monitoring the link status of high speed data links, where the error rate of link can be reliably determined despite the presence of transient errors that may otherwise create the perception of an artificially high error rate.

These and other needs are attained by the present invention, where network repeater monitors each repeater port link in communication with a remote network node at a corresponding data rate. The network repeater monitors each link by counting a detected number of symbol errors relative to a prescribed threshold. The network repeater, upon detecting a link having a poor integrity as measured by the prescribed threshold, may selectively reconfigure the link, based on user configuration signals supplied to the network repeater, by reducing the data rate on the network medium to provide a more reliable link having a reduced number of symbol errors.

According to one aspect of the present invention, a method in a network repeater of controlling transmissions includes establishing a link with a remote network node at a prescribed data rate via a network medium, monitoring the link by counting a detected number of symbol errors; determining an integrity of the link based on the detected number of symbol errors relative to a prescribed threshold, and selectively reducing the data rate on the network medium to a reduced data rate in response to the detected number of symbol errors exceeding the prescribed threshold and based on a configuration signal supplied to the network repeater. Monitoring the link by counting a detected number of symbol errors enables the network repeater to determine the link integrity of each network repeater port in a relatively simple manner without the necessity of a network manager interfering with network activity. Moreover, the selectively reducing step enables an individual user to manually configure the network repeater for data rate reduction by supplying the configuration signal, eliminating the need for a network manager.

Another aspect of the present invention provides a network repeater having a plurality of repeater ports, configured for sending and receiving data packets between remote nodes via respective network media. The network repeater includes a first repeater core configured for sending and receiving data packets between a first group of the repeater ports according to a first data rate, a second repeater core configured for sending and receiving data packets between a second group of the repeater ports according to a second data rate slower than the first data rate, an auto-negotiation unit configured for selecting one of the first and second data rates, according to stored configuration information, for establishment of links between the repeater ports and the respective remote network nodes via the respective network media, a symbol error detector for detecting a number of symbol errors relative to a prescribed interval on at least one of the links operating at the first data rate, and a controller. The controller has a configuration register for storing the configuration information supplied from a user configuration signal, and is configured for selectively changing the at least one link from the first data rate to the second data rate based on the number of symbol errors reaching a prescribed threshold and according to the stored configuration information. The symbol error detector can detect the number of symbol errors on at least one link, enabling monitoring of each link without the necessity of an external management agent. Moreover, the controller enables the link to be reduced to a lower speed in the event that a higher number of symbol errors are detected based on stored configuration settings, eliminating the necessity of an external management agent to monitor link integrity or execute more complex routines in an effort to overcome poor link integrity conditions.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference number designations represent like elements throughout and wherein.

BEST MODE FOR CARRYING OUT THE INVENTION

Figure 1:
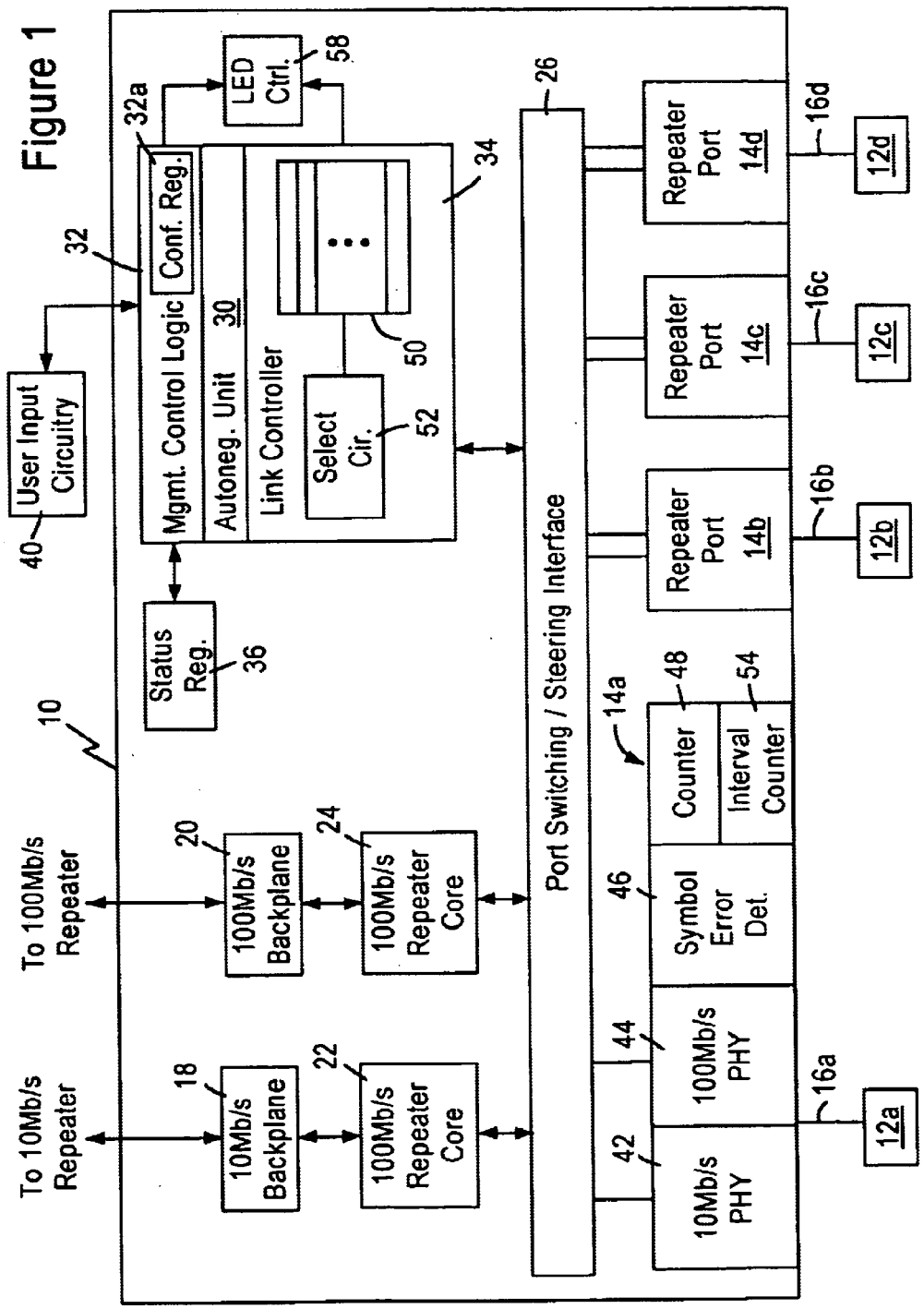
FIG. 1 is a block diagram of a network repeater according to an embodiment of the present invention.

FIG. 1 is a block diagram of a network repeater 10 configured for transmitting data packets between remote network nodes 12 according to an embodiment of the present invention. The repeater 10 is a fully integrated multiple port repeater that can operate at both 10 Mb/s and 100 Mb/s. In particular, the repeater 10 includes four repeater ports 14 that transmit and receive data packets with the respective remote network nodes 12 according to IEEE 802.3 protocol. Each repeater port 14 establishes a link with the corresponding network node 12 at a prescribed data rate (e.g., 10 Mb/s or 100 Mb/s) via a network medium 16, for example 10 BASE-T or 100 BASE-TX. As described below, each repeater port 14 automatically configures to the speed of the remote network nodes 12 using auto-negotiation protocols. As recognized in the art, the 10-BASE-T protocol specifies transmitting Ethernet (IEEE 802.3) data packets at 10 Mb/s over twisted pair of UTP wiring, where the maximum cable segment distance is 100 meters from the node 12 to the repeater 10. The 100 BASE-TX standard specifies transmission of Ethernet (IEEE 802.3) data packets at 100 Mb/s over two pairs of category 5 UTP wiring, where the maximum cable segment distance is 100 meters from the node 12 to the repeater 10.

As described below, the repeater 10 also includes a 10 Mb/s back plane 18 and a 100 Mb/s back plane 20, enabling the repeater 10 to be connected to other similar repeaters, effectively forming a large port-count repeater.

The repeater 10 also includes a 10 Mb/s repeater core 22 and a 100 Mb/s repeater core 24. The repeater cores 22 and 24 are configured for sending and receiving data packets between selected repeater ports according to the respective data rates. In particular, the repeater 10 includes a port switching and steering interface 26 configured for selectively connecting each network port 14 to one of the repeater cores 22 or 24 based on the corresponding link speed of the repeater port 14. For example, if the repeater port 14a is configured for sending and receiving data packets via medium 16a at the link speed of 10 Mb/s, the port switching and steering interface 26 connects the repeater port 14a to the repeater core 22. Similarly, if the repeater port 14b is configured for sending and receiving data packets on the medium 16b at the link speed of 100 Mb/s, the port switching and steering interface 26 connects the repeater port 14b to the 100 Mb/s repeater core 24. The port switching and steering interface 26 may be implemented as a plurality of multiplexers that selectively connect each port 14 to the appropriate repeater core 22 or 24 depending on the determined link speed for the corresponding repeater port 14.

The repeater cores 22 and 24 are implemented as state machines configured for operation compliant with IEEE 802.3 Section 9 and Section 27, respectively. In particular, the 10 Mb/s repeater state machine 22 is configured such that all repeater ports 14a operating in the 10 Mb/s collision domain, within the repeater 10 or via a 10 Mb/s expansion both coupled to the back plane 18, form a single repeater that is compliant with IEEE 802.3 Section 9. If any single port 14 connected to the 10 Mb/s repeater state machine 22 senses the start of a valid packet, the repeater core 22 will retransmit the received packet on all the other ports connected to the core 22 unless a collision is detected. The repeater core 22 also supplies the packet to the 10 Mb/s expansion bus coupled to the backplane 18 to facilitate designs using multiple repeaters 10. When retransmitting a packet, the repeater core 22 ensures that the outgoing packets comply with IEEE 802.3 signal amplitude, symmetry, and jitter requirements based on a clock that is internal to the repeater 10. In addition, the repeater core 22 will ensure that the preamble will have a minimum of 56 bits before the start of frame delimiter (SFD).

The repeater core 22 also detects and responds to collision conditions on all ports connected to the repeater core 22 as specified in IEEE 802.3, Section 9, including collision conditions detected via the back plane 18.

Other recognized functions are performed by the repeater core 22 to ensure reliable transfer of data in the 10 Mb/s collision domain for example fragment extension and auto-partition/recognition.

The 100 Mb/s repeater core 24 is implemented as a state machine configured such that all ports operating in the 100 Mb/s collision domain in the repeater 10, or via the 100 Mb/s backplane 20, form a single repeater that is complaint to IEEE 802.3u Section 27. In particular, if any port 14 connected to the 100 Mb/s core 24 senses the start of a valid packet, the repeater core 24 will transmit the received packet on all the other connected ports unless a collision is detected. The repeated data is also supplied to the backplane 20 for transmission to other repeaters connected to the backplane 20.

As described above, the 100 Mb/s repeater core 24 ensures that the outgoing packet on a transmit port complies with the IEEE 802.3u (Sections 24, 25 and 27) signal amplitude, symmetry, and jitter requirements. The transmitted signal is also retimed by an internal clock. Other recognized functions are performed by the repeater core 24 to ensure reliable transfer of data in the 100 Mb/s collision domain.

The repeater 10 also includes an auto-negotiation unit 30, management control logic 32 having a configuration (CONF) register 32a, a link controller 34, and status registers 36. The auto-negotiation unit 30 performs auto-negotiation as defined in IEEE 802.3 Section 28. The auto-negotiation unit 30 uses auto-negotiation protocol to establish a link between each repeater port 14 in the corresponding node 12 according to a selected data rate based upon the capabilities of the corresponding node 12 and the configuration settings in register 32a. For example, if the remote node 12a is capable of transmitting at 100 Mb/s, the auto-negotiation unit 30 establishes the link between the repeater port 14a and the remote network node 12a at a 100 Mb/s data rate (100 BASE-TX). However, if the remote node 12a is not able to send and receive data packets at 100 Mb/s, the auto-negotiation unit 30 establishes the link between the repeater port 14a and remote node 12a via the network medium 16a at 10 Mb/s (10 BASE-T). In particular, the auto-negotiation unit 30 uses a burst of link pulses referred to as fast link pulses (FLPs), that are spaced between 55 microseconds and 100–140 microseconds so as to be ignored by a standard 10 BASE-T receiver. The FLP burst contains information about the capabilities of the transmitting device namely the repeater port 14. The remote network node 12 capable of 100 Mb/s transmission and reception decodes the FLP burst to learn about the capabilities of the transmitting device 14.

The repeater 10 also includes management control logic 32 that provides an interface to user input circuitry 40, enabling a user to manually configure the repeater 10. The management control logic 32 allows a user to manually access the control and configuration registers 32 and the status registers 36 within the network repeater 10, configured in accordance with IEEE 802.3u Section 22. The circuitry 40 includes DIP switches and/or pull-up or pull-down transistors that supply constant voltage or current signals as the configuration signals to the repeater 10. Hence, the input circuitry 40 replaces the normally used network manager.

The link controller 34 is configured for selectively changing the established links between the repeater ports 14 and the remote network nodes 12 from the 100 Mb/s data rate to the 10 Mb/s data rate based on a detected reduction in the link integrity and the configuration settings is register 32a. Specifically, the link controller 34 is configured for detecting and correcting for excessive error rate in the 100 Mb/s links, for example due to faulty cabling or equipment. The integrity of the link each 100 Mb/s link is determined by performing a high-speed link integrity check on each 100 Mb/s link. Specifically, each repeater port 14 includes a 10 Mb/s physical layer transceiver 42, a 100 Mb/s physical layer transceiver 44, plus a symbol error detector 46, a counter 48 and an interval counter 54. The symbol error detector 46 is configured for detecting a number of symbol errors on the corresponding link when the repeater port 14 uses the 100 Mb/s transceiver 44 operating at the 100 Mb/s data rate. The counter 48 is configured for incrementing a counter value in response to each of the detected symbol errors from the PHY 44. As described below, the link controller monitors the link by counting the detected number of symbol errors for each port 14, and determines the integrity of the link based on the detected number of symbol errors relative to a prescribed threshold. If the detected number of symbol errors reaches the prescribed threshold relative to a prescribed interval counted by counter 54, the link controller 34 selectively reduces the data rate on the corresponding network medium 16 to the reduced 10 Mb/s data rate by breaking the link, and performing auto-negotiation by advertising that the corresponding repeater port 14 is only capable of 10 Mb/s operation. Hence, a second link is established at the 10 Mb/s data rate, reducing the probabilities of symbol errors.

As shown in FIG. 1, the link controller 34 includes a table 50 and a selector circuit 52. The table 50 stores a plurality of available thresholds, and the selector circuit 52 selects one of the available thresholds as the prescribed threshold corresponding to unacceptable symbol error rate based on a selection signal from the management control logic 32. Hence, the repeater 10 may be initially programmed by the user input circuitry 40 with a plurality of thresholds stored in table 50, and a configuration register may also be programmed by the user input circuitry 40 for selecting one of the thresholds, as well as the selected enabling of the downshift operation on a per-port basis.

Figure 2:
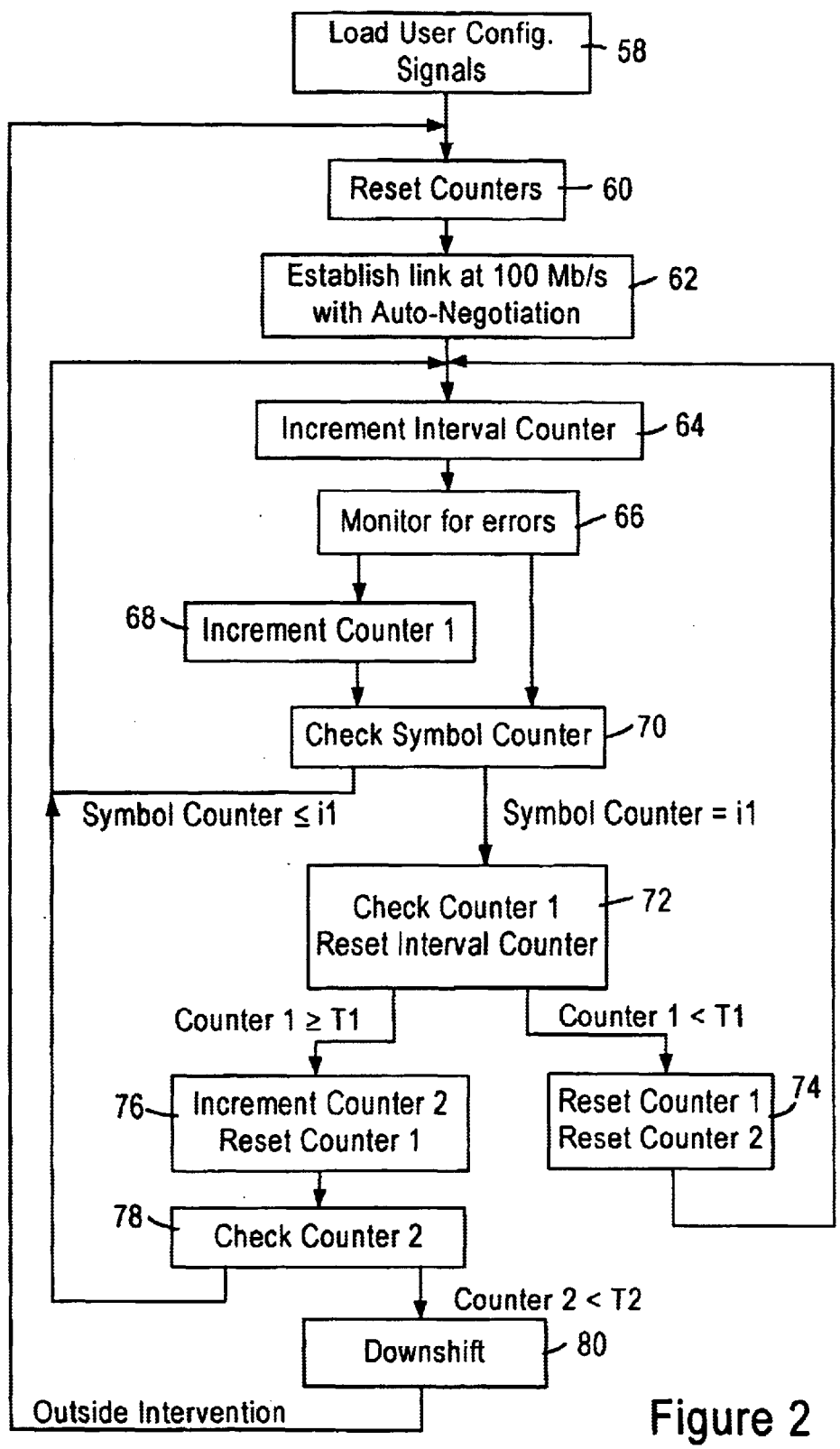
FIG. 2 is a flow diagram illustrating the method in the network repeater of controlling transmissions according to an embodiment of the present invention.

FIG. 2 is a diagram illustrating a method for controlling transmission by monitoring link integrity and selectively reducing the data transmission rate on a repeater port 14 having a link with a detected number of symbol errors reaching a prescribed threshold. The method begins in step 58, where configuration signals from the user input circuitry 40 are loaded into the configuration register 32a. The configuration settings includes at least two bits (CONF [0:1]), also referred to as configuration signals, used to configure the data rate of the network repeater 10. In particular, the configuration settings stored in register 32a are used to configure the network repeater 10 as a 100 Mb/s-only repeater, a 10 Mb/s-only repeater, a 10–100 Mb/s repeater, or a 10/100 Mb/s repeater with automatic downshift capability, as shown in Table 1.

TABLE 1

| CONF[1] | CONF[0] | Repeater State |
| --- | --- | --- |
| 1 | 1 | All Ports Forced to 100 Mb/s |
| 1 | 0 | All Ports Forced to 10 Mb/s |
| 0 | 1 | 10/100 Repeater with the speed of each port independent of the other ports. Automatic Downshift to 10 Mb/s on excessive errors also enabled |
| 0 | 0 | 10/100 Repeater with the speed of each port independent of the other ports |

Hence, the management control logic 32, the auto-negotiation unit 30, and the link controller 34 selectively establish 100 Mb/s links, 10 Mb/s links, or selectively downshift to a 10 Mb/s link based on a detected number of symbol errors exceeding a prescribed threshold, and based on the configuration signals (CONF) loaded into the configuration register 32a from the network manager 40. Hence, the user input circuitry 40 configures the network repeater for independent operation including actual monitoring of link integrity on the repeater ports 14, as well as selecting downshifting on a repeater port 14 determined as having a poor link integrity. As described below, the circuitry 40 may also be used to reconfigure a selected repeater port 14 in response to receiving an interrupt signal from the network repeater 10 indicating a detected link having a poor link integrity.

Assuming the configuration settings are set to CONF=01, for automatic downshifting in response to a detected poor link integrity, the counters 48 and 54 in each of the repeater ports 14 are then reset in step 60 to zero. The auto-negotiation unit 30 then initiates a link start up procedure in step 62 every time a link to a station 12 is connected, powered on or reset by a hard reset, or following down shifting as described below.

The symbol error detector 46 begins to monitor the corresponding link (e.g., 16a) in step 66. If a symbol error is detected by the symbol error detection circuit 46 in step 68, the detection circuit 46 increments the counter in step 70. The symbol error detection circuit 46 identifies errors based on the symbol definitions of Table 2, where any encoded symbol not matching one of the symbols of Table 2 is detected as a symbol error.

TABLE 2

Symbol Definitions

| Symbol (HEX) | NRZ | 4b/5b | Interpretation |
|---|---|---|---|
| 0 | 0000 | 11110 | Data 0 |
| 1 | 0001 | 01001 | Data 1 |
| 2 | 0010 | 10100 | Data 2 |
| 3 | 0011 | 10101 | Data 3 |
| 4 | 0100 | 01010 | Data 4 |
| 5 | 0101 | 01011 | Data 5 |
| 6 | 0110 | 01110 | Data 6 |
| 7 | 0111 | 01111 | Data 7 |
| 8 | 1000 | 10010 | Data 8 |
| 9 | 1001 | 10011 | Data 9 |
| A | 1010 | 10110 | Data A |
| B | 1011 | 10111 | Data B |
| C | 1100 | 11010 | Data C |
| D | 1101 | 11011 | Data D |
| E | 1110 | 11100 | Data E |
| F | 1111 | 11101 | Data F |
| Idle | Undefined | 11111 | Idle Symbol |
| J | 0101 | 11000 | Start of Stream Delimiter: 1 of 2 |
| K | 0101 | 10001 | Start of Stream Delimiter: 2 of 2 |
| T | Undefined | 01101 | End of Stream Delimiter: 1 of 2 |
| R | Undefined | 00111 | End of Stream Delimiter: 2 of 2 |

A False Carrier (Data Stream not beginning with /J/K/) is detected as a symbol error. Any data stream that does not transition into Idle with /T/R/I/ is detected as a symbol error.

The Symbol Counter 56 is set for a threshold i1 and the Symbol Error Counter 1 (48) is set for a threshold T1. The ratio of T1 and i1 corresponds to the selected error rate. For example, if the selected error rate is $10^{-8}$ (1 error every $10^{-8}$ data bits), i1 is set to $2.5*10^7$ and T1 is set to 1. This allows for a ratio of 1 symbol for every 4-decoded data bits. If T1 is set higher i1 must be correspondingly increased. In this example if T1 is 5, i1 must be $12.5*10^7$.

Counter 2 (54) establishes the repeatability of the relationship between Counter 1 (48) and the Symbol Counter 56. Counter 2 (54) increments whenever Counter 1 (48) meets T1 errors at i1 symbols. It is reset to 0 if Counter 1 is less than T1 at i1 symbols. The threshold T2 is somewhat arbitrary. If Counter 2 increments to T2 counts the error monitor has detected that the error rate consistently maintains the error rate threshold. If Counter 2 (54) cannot get to T2, there is a reasonable chance that the error is bursty and does not represent the designated error rate.

Once link is established at 100 Mb/s, the symbol Counter 56 continuously increments for every detected symbol in step 64 and resets itself every i1 symbols in step 72. The error monitor 46 monitors the symbol errors in step 66 for internal $i_1$ symbols. Counter 1 (48) increments in step 68 for every error detected. When the Symbol Counter equals i1 in step 70, counter 1 is checked in step 72 to see if the error count has exceeded the threshold. If counter 1 has not exceeded the threshold all the counters are reset in step 74. If Counter 1 equals or exceeds the threshold, Counter 2 is incremented in step 76. In either case counter 1 is reset and the Symbol counter 56 (i.e., interval counter) is reset.

If Counter 2 is incremented, Counter 2 is checked in step 78 to see if it has exceeded threshold T2. If T2 is exceeded, the link is broken and reestablished at 10 Mb/s in step 80. This can be done by either forcing the data rate to 10 Mb/s or by setting the 100 BASE-TX bits in Register 4 (Bit 8 and Bit 7) to 0 before restarting Auto-Negotiation.

Once the link has been reestablished at 10 Mb/s, it will remain there until it is broken via outside intervention. It could be because the link Partner breaks the link, the cable is disconnected, management restarts Auto-Negotiation, management disables Auto-Negotiation, or any number of other things that could cause the link to break. Once the link is broken and Auto-Negotiation is enabled, the link is reestablished at 100 Mb/s. All the counters are reset and the error monitor continues checking for symbol errors.

According to the disclosed embodiment, 100 Mb/s data bits can be easily monitored to determine whether link integrity is not performing to required specifications, for example, due to bad cable or poorly-performing hardware circuitry, etc. The disclosed arrangement eliminates the need for the network manager 40 to continually monitor the link status for each of the network ports. Moreover, the link controller, upon detecting the symbol error rate reaching a prescribed threshold, effectively downshifts the corresponding repeater port by breaking the link and establishing a new link at the reduced data rate.

Although the disclosed arrangement describes a single link controller 34 serving each of the repeater ports 14, and link controller 34 may alternately be implemented in each of the repeater ports 14, such that each repeater port 14 is capable of independently monitoring and controlling its own link based on detected symbol error rates. Alternatively, the symbol error detectors, counters, and timers may be centrally located with the link controller 34 to provide a more centralized architecture.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network repeater of controlling transmissions, the method comprising:
   establishing a link with a remote network node at a prescribed data rate via a network medium, the established link including encoded symbols;
   monitoring the link by counting a detected number of symbol errors;
   determining an integrity of the link based on the detected number of symbol errors relative to a prescribed threshold; and
   selectively reducing the data rate on the network medium to a reduced data rate in response to the detected number of symbol errors exceeding the prescribed threshold and based on a configuration signal supplied to at least one the network repeater, wherein
      detecting a number of symbol errors includes
         detecting the encoded symbols, comparing each detected encoded symbol with symbols stored in a symbol definition table, providing a symbol error indication when any detected encoded symbol does not match one of the symbols stored in the symbol definition table, and counting each symbol error indication, and determining the integrity of the link includes determining whether or not the detected number of symbol error indications occurring in the predetermined number of received encoded symbols equal or exceed a prescribed threshold for a predetermined number of prescribed intervals of receiving said predetermined number of received encoded symbols.

2. The method of claim 1, further comprising generating a signal indicating a problem in the integrity of the link in response to the detected number of symbol error indications reaching the prescribed threshold.

3. The method of claim 2, wherein the signal corresponds to at least one of an LED signal and an interrupt signal.

4. The method of claim 2, wherein the signal is the configuration signal output by user input circuitry to the network repeater.

5. The method of claim 4, further comprising supplying status information to the network repeater indicating at least one of a failed link integrity and a reduction in the data rate based on the failed link integrity.

6. The method of claim 1, wherein the configuration signal enables one of the selectively reducing step, setting the link to the prescribed data rate, and setting the link to the reduced data rate.

7. The method of claim 1, further comprising receiving the prescribed threshold from user input circuitry.

8. The method of claim 1, wherein the selectively reducing step comprises:

breaking the link; and establishing a second link with the remote network node by auto-negotiation according to the reduced data rate.

9. A network repeater having a plurality of repeater ports, configured for sending and receiving data packets between remote network nodes via respective network media, the network repeater comprising:

a first repeater core configured for sending and receiving data packets between a first group of the repeater ports according to a first data rate;

a second repeater core configured for sending and receiving data packets between a second group of the repeater ports according to a second data rate slower than the first data rate;

an auto-negotiation unit configured for selecting one of the first and second data rates, according to stored configuration information, for establishment of links between the repeater ports and the respective remote network nodes via the respective network media, at least one of the links operating at the first data rate and including encoded symbols;

a symbol error detector for detecting a number of symbol errors on the at least one of the links operating at the first data rate, wherein detecting a number of symbol errors includes detecting the encoded symbols, comparing each detected encoded symbol with symbols stored in a symbol definition table, providing a symbol error indication when any detected encoded symbol does not match one of the symbols stored in the symbol definition table, and counting the symbol error indications;

a controller having a configuration register for storing the configuration information supplied from a user configuration signal, and configured for selectively changing the at least one link from the first data rate to the second data rate based on the number of symbol error indications reaching a prescribed threshold and according to the stored configuration information, wherein the symbol error detector includes a counter configured for incrementing a counter value in response to said each symbol error indication, the counter resetting the counter value each prescribed interval of receiving a predetermined number of received encoded symbols; and the network repeater further comprising:

a user circuit interface for receiving the prescribed threshold and the configuration from a circuit outputting the configuration signal, the controller outputting an interrupt signal in response to the number of symbol error indications, occurring in the predetermined number of received encoded symbols, equaling or exceeding the prescribed threshold for a predetermined number of said prescribed intervals of receiving said predetermined number of received encoded symbols.

10. The network repeater of claim 9, wherein the user circuit interface outputs status information indicating at least one of a failed link integrity and a reduction in the data rate based on the network manager servicing the interrupt signal.

* * * * *